United States Patent [19]

James

[11] 4,273,490
[45] Jun. 16, 1981

[54] STACKING APPARATUS

[75] Inventor: Raymond E. James, Chicago, Ill.

[73] Assignee: Palletron Incorporated, Schiller Park, Ill.

[21] Appl. No.: 81,768

[22] Filed: Oct. 4, 1979

[51] Int. Cl.³ .............................................. B65G 57/30
[52] U.S. Cl. ..................................... 414/95; 414/900
[58] Field of Search ...................... 414/92, 95, 96, 102, 414/127, 900; 29/432, 798

[56] References Cited

U.S. PATENT DOCUMENTS

| 3,401,808 | 9/1968 | Kemp | 414/95 |
| 3,844,423 | 10/1974 | Loomer et al. | 414/96 |

FOREIGN PATENT DOCUMENTS

| 105974 | 11/1966 | Denmark | 414/95 |
| 1471060 | 1/1967 | France | 414/92 |
| 491559 | 2/1976 | U.S.S.R. | 414/95 |

Primary Examiner—Leslie J. Paperner
Attorney, Agent, or Firm—Emrich, Root, Lee, Brown & Hill

[57] ABSTRACT

The apparatus receives wooden pallets horizontally with the pallets moving in a direction parallel to the stringers and forms a vertical stack by depositing a partial stack of pallets on each new pallet and lifting all of the pallets to receive a new one. The apparatus is adjustable for pallet sizes over a wide range.

7 Claims, 9 Drawing Figures

STACKING APPARATUS

BACKGROUND AND SUMMARY

The present invention relates to stacking apparatus of the type used in the pallet manufacturing industry, for example. Such apparatus has as a principal function the formation of a vertical stack of pallets up to, for example, twenty such pallets which are delivered to the apparatus horizontally.

Existing stackers of the type with which the present invention is concerned require that the pallets being fed to the stacker be disposed such that the stringers extend transverse of the direction in which the pallets are delivered. In the case where the pallet assembly apparatus delivers manufactured pallets in a direction parallel to the stringers, each pallet must be turned ninety degrees before it can be fed into an automatic stacker of the type in the prior art. This can be inefficient and, if it requires additional equipment or manpower, costly.

The stacker of the present invention is designed to operate in close cooperation with a pallet assembly machine of the type disclosed in my copending, co-owned application, Ser. No. 11,204, entitled APPARATUS AND METHOD FOR ASSEMBLING PALLETS, filed Feb. 12, 1979. As disclosed in that application, an assembled pallet is delivered from the bottom of the machine in a direction parallel to the axis of the stringers. The apparatus of the present stacker includes a vertically reciprocating frame having two swinging end gates, referred to respectively as a headgate and a tailgate. The frame is reciprocated by a pair of scissors linkages which interconnect a base with the reciprocating frame. The scissors linkages are preferably powered by main pneumatic cylinders arranged with their axes in a vertical disposition.

With the reciprocating frame in a raised position, a pallet is received beneath the tailgate and the leading edge of the pallet is stopped adjacent the headgate of the reciprocating frame. The frame surrounds the periphery of the pallet when it is delivered to the stacker; and a switch responsive to a pallet in the fully delivered position actuates the main cylinders to retract and thereby lower the frame about the delivered pallet.

The headgate and the tailgate are each provided with lifter elements which extend into the spaces between deck boards and stringers and support the pallets already stacked by engaging the end, top deck boards of the lowest pallet in the stack. Thus, when the frame is lowered about the most recently delivered pallet, the partial stack of already-stacked pallets is also lowered and the weight of the partial stack is transferred to the most recently received pallet. After the weight of the stack is thus transferred, cam-actuated mechanisms cause both gates to swing outwardly so that the lifter elements swing about the top deck boards of the lowermost pallet so as to avoid obstruction.

When the frame is fully lowered, the same cam-actuated mechanism is released and the end gates are returned to their stacking positions. The return of the end gates may be assisted by springs, if necessary. Further, when the frame is in its lowermost position, a pneumatic limit switch is actuated to reverse the main pneumatic cylinders and thereby raise the frame and the partial stack of pallets, together with the most recently delivered pallet so that the apparatus is ready to receive another pallet beneath the new partial stack.

When a stack is formed to the desired height (or number of pallets in the stack), the delivery mechanism is actuated into an extended cycle and pushes the complete stack of pallets out of the apparatus in the same direction as the pallets had been delivered by rotating the headgate out of the way. After the stack of pallets is ejected from the stacking apparatus, the headgate is returned to its stacking position.

It will thus be appreciated that the present invention is designed to form a vertical stack from horizontally delivered pallets which are fed into the apparatus in a direction parallel to the length of the stringers and are also fed out of the apparatus in the same direction, as a continuation of the delivery motion.

Other features and advantages of the present invention will be apparent to persons skilled in the art from the following detailed description of a preferred embodiment accompanied by the attached drawing wherein identical reference numerals will refer to like parts in the various views.

DETAILED DESCRIPTION

Figure 1:
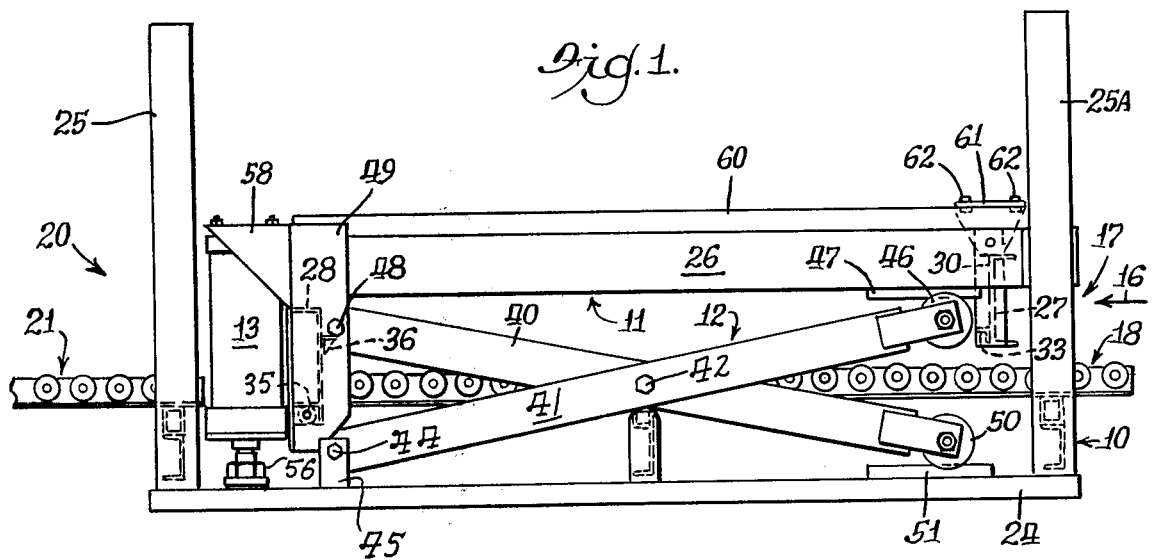
FIG. 1 is a side view of apparatus constructed according to the present invention.

Referring first to FIG. 1, the apparatus includes a base frame generally designated by reference numeral 10, a vertically reciprocating frame generally designated 11, and a pair of side scissors linkages, designated 12 and 12A (see FIG. 6), which are actuated or powered by a pair of main pneumatic cylinders, one of which is seen in FIG. 1 and designated 13.

For purposes of reference, right and left refer to the sides of the machine when looking in the direction in which pallets are moved, as indicated in FIG. 1 by the arrow 16. Individual pallets are delivered horizontally at an input end 17 along a roller conveyor 18; and once a stack is formed, the same mechanism which delivers the pallets may be used to push them out the output end 20 onto an accumulating conveyor generally designated 21.

Figure 2:
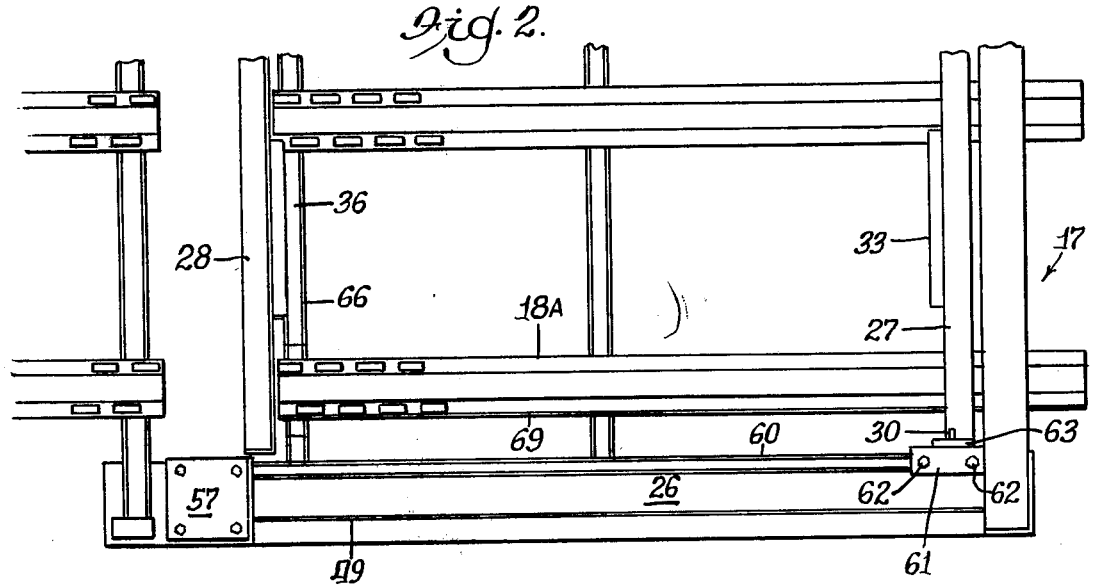
FIG. 2 is a fragmentary plan view of the apparatus of FIG. 1.
Figure 3:
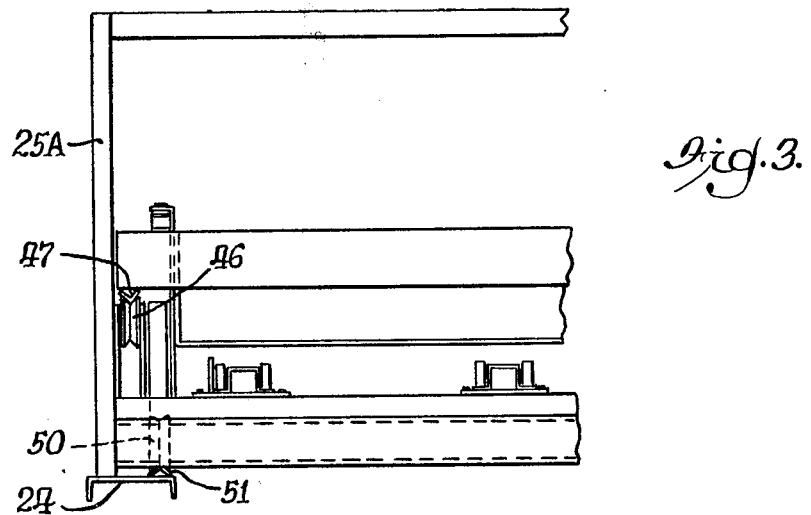
FIG. 3 is a fragmentary end view of the apparatus of FIG. 1 looking in the direction in which pallets are delivered to the apparatus.

In FIGS. 2 and 3, the left side of the machine only is shown, and except for those instances fully described below, the apparatus is symmetrical about its longitudinal center line, so that the right side is similar to the left side and need not be shown in more detail.

The base 10 includes floor-engaging channels, one of which is designated 24, and an upright member or post at each corner (see elements 25, 25A) which are secured together and braced as needed to form a rigid frame. The detailed structure of the frame and the delivery apparatus do not form a part of this invention and need not be discussed in greater detail.

The reciprocating frame 11 includes first and second side members, one of which is seen at 26 which are parallel to the direction of movement of the pallets and are secued together by means of a tailgate 27 at the input end 17 and a headgate 28 at the output end 20.

The tailgate is pinned to the side frame members 26, 26A (see the pin 30 connecting it to side frame member 26) for rotation about an axis above the gate (see FIG. 1). A lift member, which may be in the form of an angle iron and designated 33 is secured to the tailgate 27 and extends inwardly thereof toward a pallet which has been delivered for stacking. A delivered pallet will be received within a vetical extension of the reciprocating frame 11, as will be understood from subsequent description. When a pallet has thus been received by the apparatus and the frame 26 lowered, the lifter element 33 fits into the pallet about the bottom deck boards and beneath the top deck boards of the pallet. Further, as can be seen from FIG. 2, the lifter member 33 does not interfere with any of the pallet stringers. A similar lifter member is located on the right side of the tailgate 27.

The headgate 28 may be constructed similar to the tailgate 27, however, it is pivotally mounted to the side frame members of the reciprocating frame 11 to rotate about an axis beneath it, see the pin designated 35 in FIG. 1. Further, the inner surface of the gate 28 is provided with a lifter member 36 which performs a function similar to the described for the lifter member 33 on the tailgate 27.

Turning now to the scissors linkage 12, it includes first and second tubular links 40, 41 which are pivotally connected together by means of a bolt 42 at an intermediate location. One end of the link 41 is pivotally connected by means of a bolt 44 to a bracket 45 welded to the channel member 24 of the frame 10. The other end of the link 41 is provided with a V-track wheel 46 (see FIG. 3), which rides on a correspondingly shaped track 47 secured beneath the side frame member 26 of the reciprocating frame 11. The link 40 is pivotally connected by means of a bolt 48 to a plate 49 which is secured to the side frame member 26 of the reciprocating frame 11. The other end of the link 40 is provided with a V-track wheel 50 which rides on a correspondingly shaped track 51 which is welded to the channel member 24 of the frame 10.

The cylinder 13 has its rod end provided with a foot 56 which rests on the channel member 24 of the frame 10; and its cylinder end is bolted to a plate 57 (see FIG. 2) which is secured to the reciprocating frame 11 and may be braced by means of a brace 58 as seen in FIG. 1. When the pneumatic cylinder 13 is extended, the pin connection 48 is driven upwardly relative to the pin connection 44, and the corresponding force is transmitted by means of the pin connection 42 to the wheels 46, 50 for stability to provide a smooth upward force. Lateral stability is provided by the shape of the V-track wheels and their associated tracks.

An adjusting channel 60 is secured to the top of the side frame member 26. A plate 61 is bolted to the channel at 62; and a plate 63 is welded to the plate 61 and extends downwardly to provide the pin connection 30 to the tailgate 27. Thus, the tailgate 27 can be adjusted for stringers of different length by loosening the screw 62 and sliding the plate 61 along the adjusting channel 60. Similarly, adjustment for length of deck boards is provided by transverse adjusting channel members, one of which is designated 66 in FIG. 2 for similarly securing the roller conveyor 18A, the outboard end of which is provided with a vertically extending side guide member 69 (not seen in FIG. 1 for brevity).

OPERATION

Figure 4:
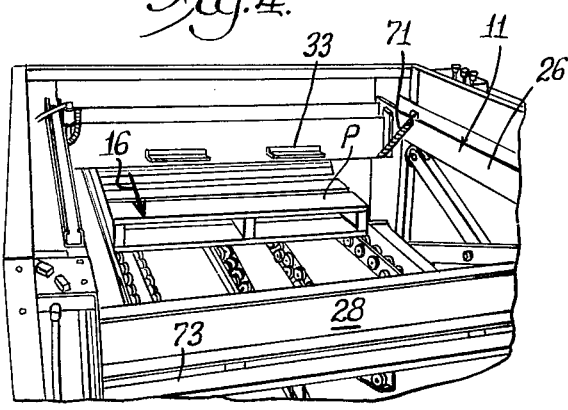
FIG. 4 is an upper perspective view of the apparatus of FIG. 1 looking from the left side of the output end and showing a first pallet being delivered.

Turning now to FIG. 4, with the pneumatic cylinders extended, the reciprocating frame 11 is in the raised position, and the apparatus is ready to receive a pallet P beneath the tailgate 27 which is in its normal, lifting position. If previous pallets had been stacked, they would be held by the lifter members 33 on the tailgate 27 and the corresponding lifter member on the headgate 28. The bottom deck boards of the lowest member of a partial stack would not interfere with the delivery of the pallet P beneath the frame 26. If it is desired to assist the positive engagement of the gate 27, a spring such as that designated 71 may be used.

Figure 5:
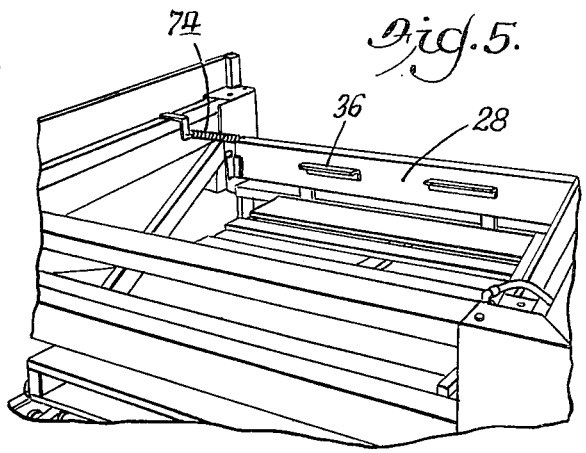
FIG. 5 is an upper perspective view of the apparatus of FIG. 1 with a first pallet delivered and taken from the right side of the output end of the apparatus.

Turning now to FIG. 5, there is shown a perspective view looking from the input end of the machine. When the pallet P is fully delivered, it engages a transverse member designated 73 which is secured to the base beneath the headgate 28 in the raised position. The headgate 28 may also be provided with a bias spring 74 for assisting it to be located in the lifting position.

Figure 6:
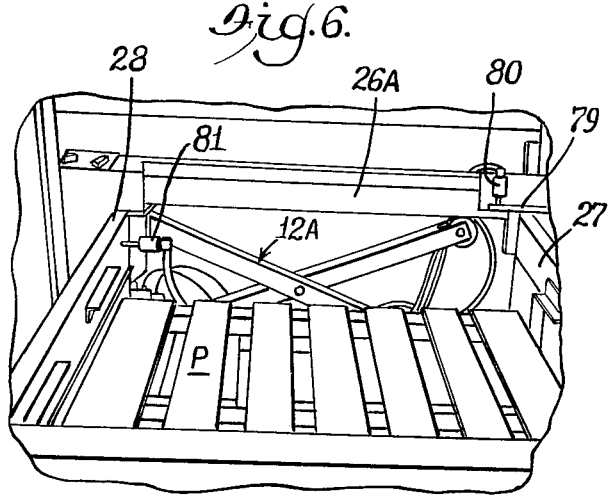
FIGS. 6–9 are perspective views taken from the left side of the apparatus illustrating the sequence of operations of the reciprocating frame through a complete cycle.

Turning now to FIG. 6, the pallet P is seen in a fully delivered position, and the complementary scissors linkage (that is, the right side one) can be seen and is designated 12A. It will also be observed from FIG. 6 that the tailgate 27 has welded to it an arm 79; and a linear pneumatic actuator 80 is secured to the side frame member 26A of the reciprocating frame on which the end gate 27 is mounted. When the actuator 80 is energized, as will be described below, its plunger extends to rotate the arm 79 counterclockwise and push the tailgate 27 away from the pallets in such a manner that its lifter members are swung outwardly in total disengagement from the pallet received in the stacker (as well as from the lower deck boards of the bottom pallet on a partial stack).

A similar pneumatic actuator 81 is also seen in FIG. 6 for engaging the headgate 28 to move it out of the way when that actuator is energized.

Figure 7:
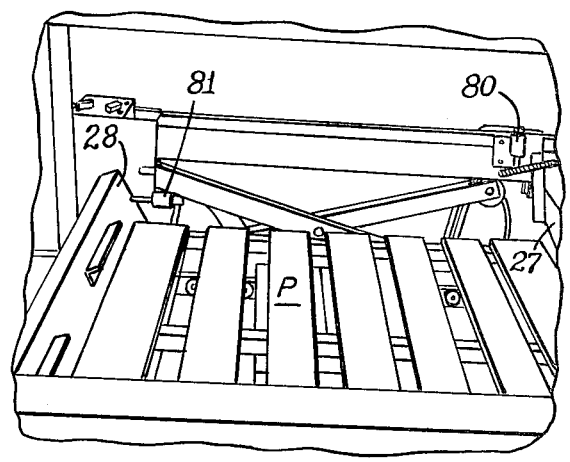

Turning now to FIG. 7, the apparatus is shown with the reciprocating frame 11 partially lowered to a position where a partial stack rests on the newly received pallet P; and the pneumatic actuators 80 and 81 are energized to swing the gates 27, 28 outwardly. With the gates thus swung outwardly, the reciprocating frame can be fully lowered without interference of the lifters.

Figure 8:
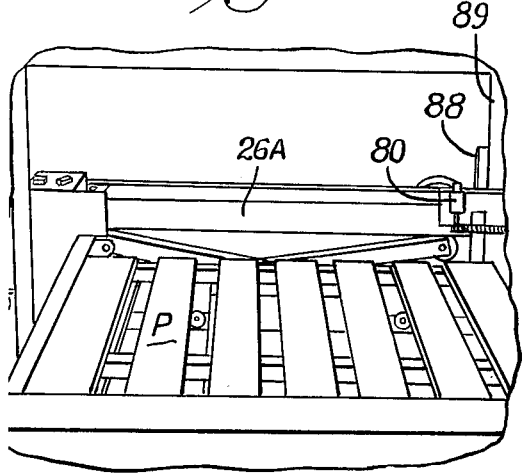
Figure 9:
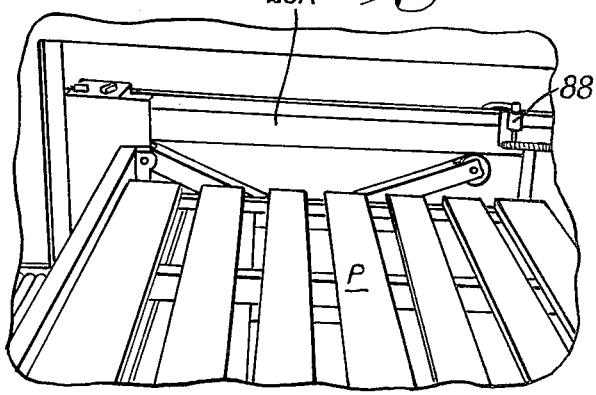

Referring now to FIG. 8, the actuators 80, 81 are energized by means of a cam surface 88 located on a corner post 89 of the frame 10. A cam follower (not seen in FIG. 8) is located on the outboard side of the side frame member 26A of the reciprocating frame 11 for energizing the pneumatic actuators 80, 81. When the cam follower is raised by the cam member 88, the actuators are energized, and after the frame is fully lowered, the cam follower disengages the surface 88; and the actuators 80, 81 are de-energized so that that gates 27, 28 may swing back into a lifting position assisted by their associated springs as described above. Thus, the lifter members are beneath the end upper deck boards of the newly inserted pallet P for lifting the new partial stack including the newly delivered pallet P, as seen in FIG. 9 with the reciprocating frame 11 again being vertically actuated by means of the pneumatic cylinders. Suitable pneumatic controls, either manual or automatic, may be used for actuating the main power cylinders, as desired. It will thus be observed that the pallets are delivered to the stacking apparatus parallel to the length of the stringers; and a fully formed stack is delivered from the apparatus in the same direction—that is, parallel to the stringers. During delivery, because the headgate 28 rotates about a lower pivot location, it is simply swung out of the way; and after the stack is delivered it may be returned either by hand or by spring action.

Having thus disclosed in detail a preferred embodiment of the invention, persons skilled in the art will be able to modify certain of the structure which has been disclosed and to substitute equivalent elements for those which have been described while continuing to practice the principle of the invention; and it is, therefore, intended that all such modifications and substitutions be covered as they are embraced within the spirit and scope of the appended claims.

I claim:

1. Apparatus for forming a vertical stack of pallets being delivered horizontally comprising: means receiving said pallets in a direction parallel to the length of the stringers of said pallet; a vertically reciprocating frame including first and second pivotal end gates extending transverse of said stringers and each including lifter members; power means for selectively raising and lowering said reciprocating frame relative to a pallet received in said apparatus; and actuating means for swinging said gates outwardly of a pallet received in said apparatus when said reciprocating frame is lowered to a position at which the weight of a partial stack held by said reciprocating frame is transferred to a newly received pallet, said actuating means further swinging said gates to a lifting position when said frame is fully lowered.

2. The apparatus of claim 1 wherein said reciprocating frame includes first and second side frame members, said end gates being located respectively at the input and output ends of said apparatus and pivotally mounted to said side frame members.

3. The apparatus of claim 2 wherein the end gate located at the output end of said apparatus pivots about an axis beneath said gate in its raised position, whereby a completed stack of pallets may be pushed along said pallet receiving means to rotate said output end gate to a horizontal position to permit said stack of pallets to move over said output end gate.

4. The apparatus of claim 3 further comprising means for urging said output end gate to the lifting position after said stack is discharged.

5. The apparatus of claim 1 wherein said apparatus includes a base, and said power means comprises scissors linkage means connected between said base and said reciprocating frame; and cylinder and piston rod means connected to extend and close said scissors linkage means selectively to raise and lower said reciprocating frame.

6. The apparatus of claim 5 wherein said cylinder and piston rod means comprises first and second pneumatic cylinders located on either side of the output end of said apparatus.

7. The apparatus of claim 1 further comprising means for adjusting said end gates to receive pallets of different size stringers.

* * * * *